United States Patent
Sasaoka

(10) Patent No.: US 8,298,716 B2
(45) Date of Patent: Oct. 30, 2012

(54) METHOD OF MANUFACTURING SEAL-INTEGRATED TYPE MEMBRANE ELECTRODE ASSEMBLY

(75) Inventor: Tomoharu Sasaoka, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 988 days.

(21) Appl. No.: 12/279,196

(22) PCT Filed: Mar. 13, 2007

(86) PCT No.: PCT/IB2007/000603
§ 371 (c)(1),
(2), (4) Date: Aug. 13, 2008

(87) PCT Pub. No.: WO2007/105073
PCT Pub. Date: Sep. 20, 2007

(65) Prior Publication Data
US 2009/0023035 A1    Jan. 22, 2009

(30) Foreign Application Priority Data
Mar. 14, 2006    (JP) .................... 2006-068897

(51) Int. Cl.
| H01M 2/38 | (2006.01) |
| H01M 2/40 | (2006.01) |
| H01M 8/24 | (2006.01) |
| H01M 2/02 | (2006.01) |
| H01M 2/08 | (2006.01) |
| H01M 8/10 | (2006.01) |
| H01M 8/12 | (2006.01) |
| H01M 8/00 | (2006.01) |

(52) U.S. Cl. ........ 429/460; 429/452; 429/454; 429/456; 429/457; 429/458; 429/463; 429/496; 429/535

(58) Field of Classification Search ................. None
See application file for complete search history.

(56) References Cited

U.S. PATENT DOCUMENTS
2,613,395 A * 10/1952 Massler .................... 264/37.33
(Continued)

FOREIGN PATENT DOCUMENTS
EP    1 341 249 A1    9/2003
(Continued)

OTHER PUBLICATIONS
Office Action from the U.S. Patent and Trademark Office for U.S. Appl. No. 12/086,617 dated Jul. 19, 2011.
(Continued)

Primary Examiner — Keith Walker
Assistant Examiner — Jennifer Rea
(74) Attorney, Agent, or Firm — Finnegan, Henderson, Farabow, Garrett & Dunner, LLP

(57) ABSTRACT

In a process of manufacturing a membrane electrode assembly, seal-material flow holes (62a, 62b) in the form of through-holes are formed, separately from manifold holes (16a-16f), in the membrane electrode assembly prior to injection molding. When the membrane electrode assembly is placed in a mold for injection molding, the seal-material flow hole (62a) is located in a cavity (44a). When a seal material is supplied from a supply port (42) formed at a location where the manifold hole (16a) is formed, the seal material that flows toward the upper die (40a) passes the seal-material flow hole (62a) in the cavity (44a), and then flows toward the lower die (40b), so as to reduce the unevenness between the amounts of supply of the seal material to the upper die (40a) and the lower die (40b).

5 Claims, 14 Drawing Sheets

U.S. PATENT DOCUMENTS

| | | | |
|---|---|---|---|
| 6,020,083 | A | 2/2000 | Breault et al. |
| 6,057,054 | A | 5/2000 | Barton et al. |
| 6,840,969 | B2 * | 1/2005 | Kobayashi et al. .......... 29/623.2 |
| 2004/0137303 | A1 | 7/2004 | Kuroki et al. |
| 2004/0191604 | A1 * | 9/2004 | Artibise et al. ................. 429/35 |
| 2006/0099486 | A1 | 5/2006 | Sompalli et al. |
| 2006/0222840 | A1 | 10/2006 | Frisk et al. |
| 2010/0167171 | A1 | 7/2010 | Sasaoka |

FOREIGN PATENT DOCUMENTS

| | | |
|---|---|---|
| EP | 1 526 593 A1 | 4/2005 |
| EP | 1 302 996 A3 | 4/2006 |
| JP | 2000-058073 | 2/2000 |
| JP | 2001-102072 | 4/2001 |
| JP | 2001-510932 | 8/2001 |
| JP | 2001-351651 | 12/2001 |
| JP | 2002-42836 | 2/2002 |
| JP | 2002-117872 | 4/2002 |
| JP | 2002-231274 | 8/2002 |
| JP | 2002-237317 | 8/2002 |
| JP | 2002-260693 | 9/2002 |
| JP | 2003-68319 | 3/2003 |
| JP | 2003-157867 | 5/2003 |
| JP | 2003-210986 | 7/2003 |
| JP | 2003-257454 | 9/2003 |
| JP | 2004-146265 | 5/2004 |
| JP | 2005-174875 | 6/2005 |
| JP | 2005-516350 | 6/2005 |
| JP | 2005-183210 | 7/2005 |
| JP | 2005-293944 | 10/2005 |
| JP | 2005-327514 | 11/2005 |
| JP | 2007-503688 | 2/2007 |
| WO | WO 99/04605 | 1/1999 |
| WO | WO 02/061869 | 8/2002 |
| WO | WO 02/089240 | 11/2002 |
| WO | WO 2004/088779 | 10/2004 |
| WO | WO 2005/020356 | 3/2005 |

OTHER PUBLICATIONS

Notification of Reason(s) for Refusal dated Jan. 24, 2012 from Japanese Patent Office regarding Japanese Patent Application No. 2006-007681, Partial.

Notification of Reason(s) for Refusal dated Jan. 24, 2012 from Japanese Patent Office regarding Japanese Patent Application No. 2006-068897, Partial.

* cited by examiner

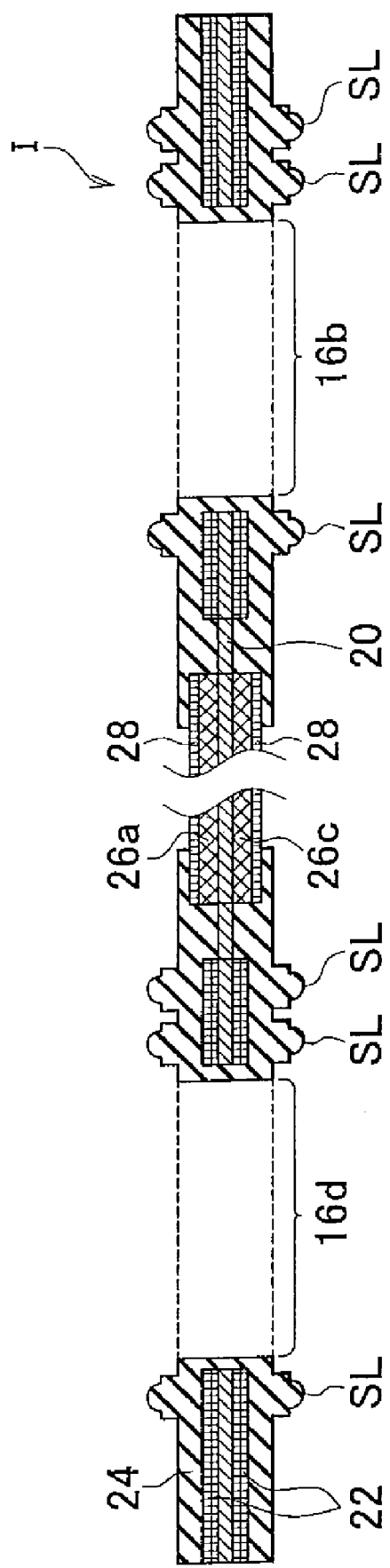

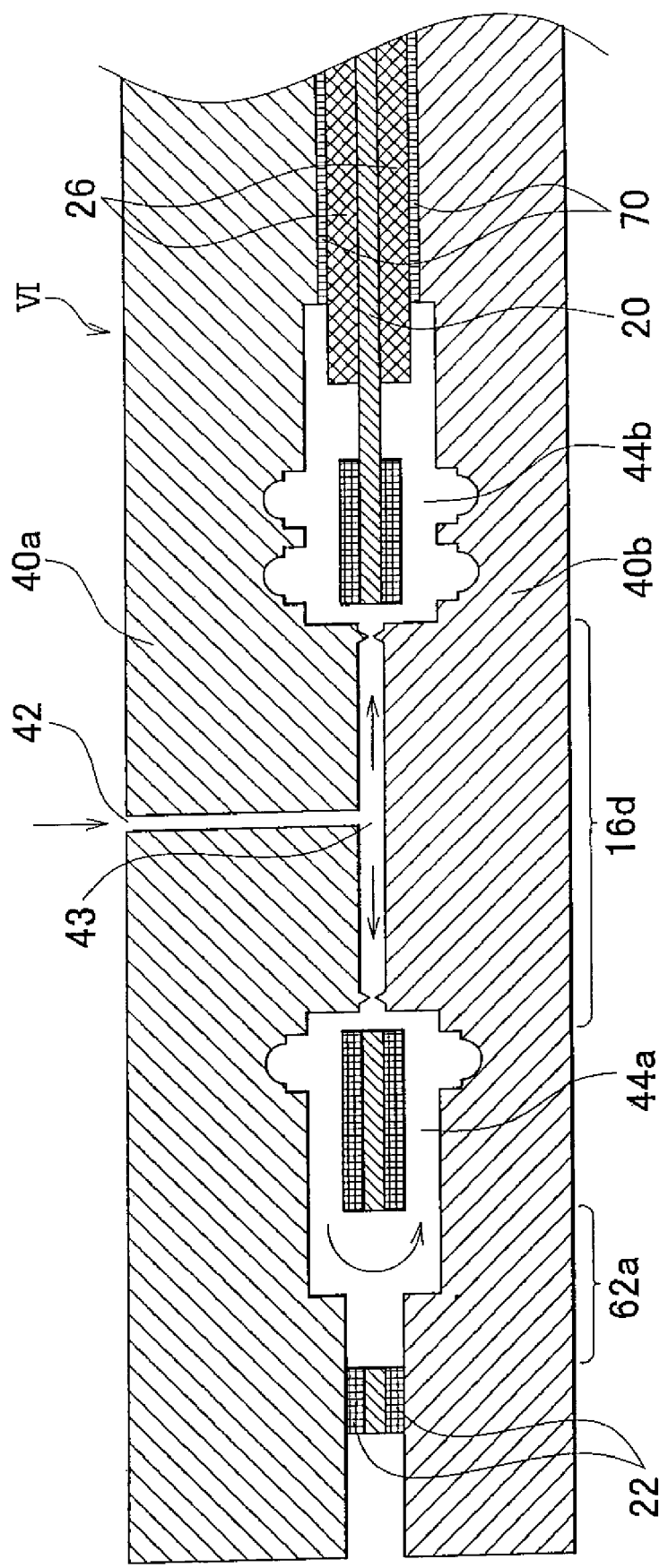

METHOD OF MANUFACTURING SEAL-INTEGRATED TYPE MEMBRANE ELECTRODE ASSEMBLY

CROSS-REFERENCE TO RELATED APPLICATIONS

This application is a national phase application of International Application No. PCT/IB2007/000603, filed Mar. 13, 2007, and claims the priority of Japanese Application No. 2006-068897, filed Mar. 14, 2006, the contents of both of which are incorporated herein by reference.

BACKGROUND OF THE INVENTION

1. Field of the Invention

The invention relates to a membrane electrode assembly used in a fuel cell.

2. Description of the Related Art

A fuel cell is comprised of a plurality of unit cells that are stacked together, and each unit cell has a membrane electrode assembly sandwiched by and between separators. The membrane electrode assembly consists of an electrolyte membrane, and a pair of electrode catalyst layers by and between which the electrolyte membrane is sandwiched. Manifold holes that provide fluid channels for, for example, fuel gas and water are formed in an outer peripheral portion of the membrane electrode assembly. Also, in order to improve the fluid tightness of the membrane electrode assembly sandwiched between the separators, a technique for forming a seal gasket by injection molding on the opposite surfaces of the membrane electrode assembly is known (as disclosed in, for example, JP-A-2003-68319).

However, problems are likely to occur in the process of manufacturing the membrane electrode assembly since its constituent components, such as the electrolyte membrane and the electrode catalyst layers, have low strength. For example, when the membrane electrode assembly is placed in a mold for injection molding of the seal gasket, a portion of the membrane electrode assembly which is not supported in a cavity of the mold may be warped or curved under the influence of, for example, the gravity. If a seal material that is in a fused state is injected into the mold in this condition, flow of the seal material may be hampered or obstructed, resulting in occurrence of molding failures or defects.

Also, the membrane electrode assembly has another problem that its constituent components are likely to peel off from outer end faces of the assembly.

SUMMARY OF THE INVENTION

The invention provides a technique for reducing the occurrence of failures or defects in a process of manufacturing a membrane electrode assembly.

A first aspect of the invention provides a method of manufacturing a seal-integrated type membrane electrode assembly for use in a fuel cell, which method includes (a) a step of preparing a membrane electrode assembly through which a manifold hole and a seal-material flow hole are formed, (b) a step of placing the membrane electrode assembly in a mold, and (c) a step of feeding a seal material into the mold, thereby to form a seal gasket having a seal line by injection molding, the seal line being formed around the manifold hole. In this method, the membrane electrode assembly is formed such that an inside peripheral portion of each of the manifold hole and the seal-material flow hole is located in the same cavity of the mold.

According to this method, when the seal material is supplied into the mold, the seal material flows into the seal-material flow hole, and is thus substantially uniformly supplied to the opposite surfaces of the membrane electrode assembly, so that the occurrence of molding failures or defects can be reduced.

The manifold hole and the seal-material flow hole may be formed in an outer peripheral portion of the membrane electrode assembly, and reinforcing member may be provided on the outer peripheral portion of the membrane electrode assembly. In the above-indicated step (c), end faces of the membrane electrode assembly and the reinforcing member may be covered with the seal material.

According to this method, the seal gasket is formed by injection molding in the outer peripheral portion of the membrane electrode assembly, and the injection molding can be easily carried out. Also, the strength of the seal-integrated type membrane electrode assembly itself and those of the interior wall of the manifold hole are increased, so that the membrane electrode assembly is less likely to be damaged or broken when mounted into a fuel cell or during use of the fuel cell.

In the above-indicated step (c), the seal material may be supplied into the mold, from a location where the manifold hole is formed.

According to this method, the seal material can be uniformly supplied to the periphery of the manifold hole, so as to uniformly form lip portion around the manifold hole.

At least one of the seal-material flow hole may be formed so as to be located between the manifold hole and an outer periphery of the membrane electrode assembly, and the method may further include a step of cutting off an outer peripheral portion of the membrane electrode assembly along a plane in which the above-indicated at least one seal-material flow hole is present.

According to this method, in the cutting plane in which the seal-material flow hole or holes is/are present, the seal material covers the mating surfaces between the membrane electrode assembly and the reinforcing member, so as to prevent peel-off at the mating surfaces and improve the strength of the membrane electrode assembly.

A second aspect of the invention provides a seal-integrated type membrane electrode assembly for use in a fuel cell, which comprises: a membrane electrode assembly including an electrolyte membrane and a pair of electrode layers by and between which the electrolyte membrane is sandwiched, a manifold hole that extend through the membrane electrode assembly, and a seal gasket that provides a seal line around the manifold hole. The seal-integrated type membrane electrode assembly is characterized in that only a part of an outer periphery of the membrane electrode assembly is covered with a seal material of the seal gasket, and the other part of the outer periphery of the membrane electrode assembly has an end face exposed to the outside of the assembly without being covered with the seal material.

With the seal-integrated type membrane electrode assembly constructed as described above, its constituent components can be prevented from peeling off from each other at its portions covered with the seal material.

The invention may be embodied or realized in various forms. For example, the invention may be embodied in the form of a seal-integrated type membrane electrode assembly, a fuel cell having the seal-integrated type membrane electrode assemblies, or a vehicle having the fuel cell.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 2 is a cross-sectional view of a seal-integrated type membrane electrode assembly;

FIG. 7 is a view useful for explaining injection molding for the membrane electrode assembly of the embodiment;

DETAILED DESCRIPTION OF THE PREFERRED EMBODIMENTS

Figure 1:
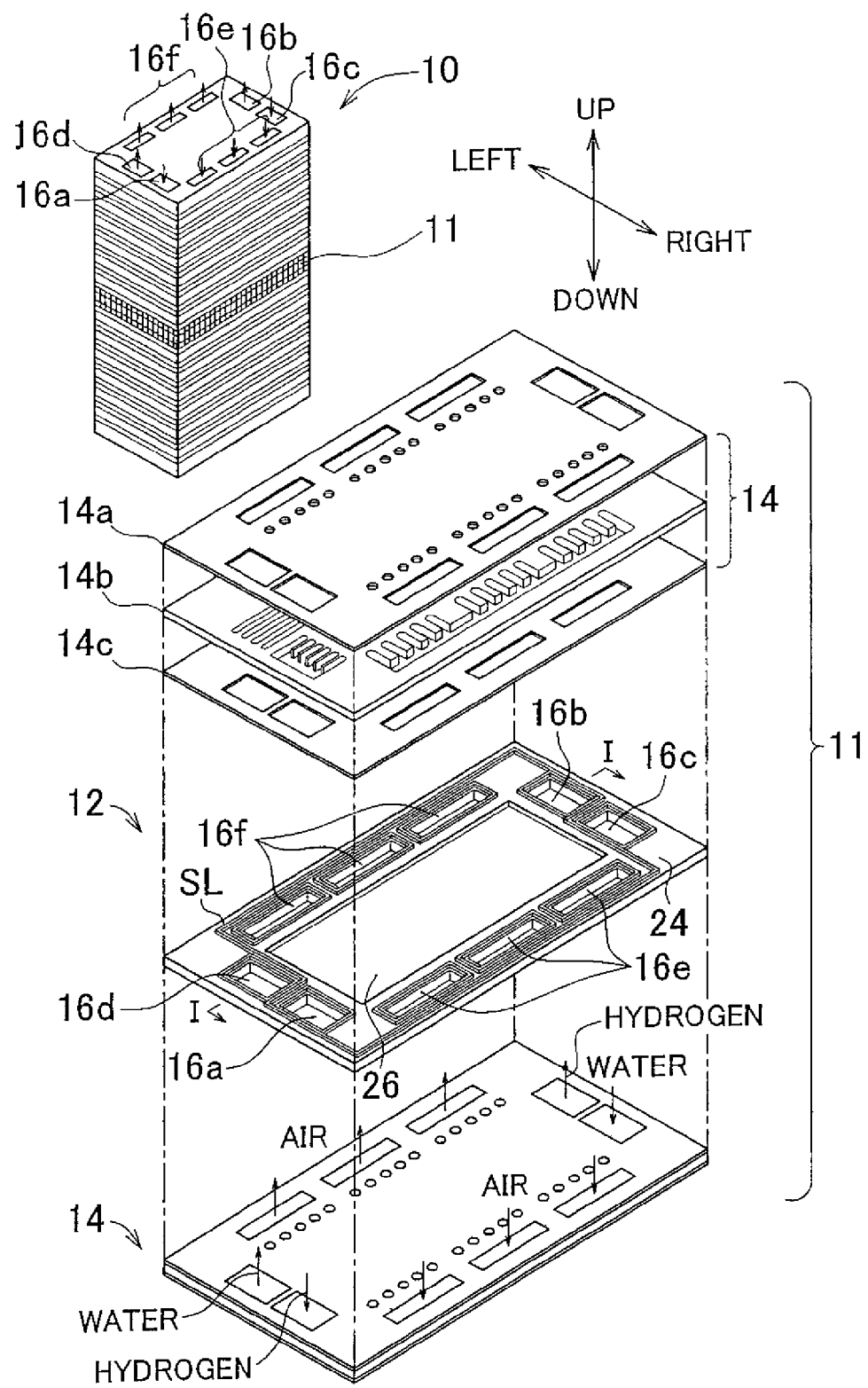
FIG. 1 is an explanatory view schematically showing the construction of a fuel cell.

A. CONSTRUCTION OF FUEL CELL: FIG. 1 schematically illustrates the construction of a fuel cell 10 using seal-integrated type membrane electrode assemblies according to one embodiment of the invention. The fuel cell 10 of this embodiment is a polymer electrolyte fuel cell that is supplied with fuel gas (i.e., hydrogen gas and air), and generates electric power through an electrochemical reaction between hydrogen and oxygen.

The fuel cell 10 has a stacked structure in which a plurality of unit cells 11 are stacked or laminated together. Each of the unit cells 11 includes a seal-integrated type membrane electrode assembly 12, and separators 14 that sandwich the seal-integrated type membrane electrode assembly 12 therebetween.

The fuel cell 10 has manifolds formed therethrough in the direction in which the unit cells 11 are stacked together. The manifolds provide channels through which hydrogen gas (anode gas), air (cathode gas) and cooling water are supplied and discharged. To provide the manifolds of the fuel cell 10, manifold holes 16a-16f are formed in respective peripheral portions of the separators 14 and seal-integrated type membrane electrode assemblies 12. More specifically, the manifold hole 16a is a supply port of hydrogen gas, and the manifold hole 16b is a discharge port of hydrogen gas, while the manifold hole 16c is a supply port of cooling water, and the manifold hole 16d is a discharge port of cooling water. Also, the manifold hole 16e is a supply port of air, and the manifold hole 16f is a discharge port of air. The manifold holes 16a-16f may be otherwise constructed or arranged in other forms.

A seal gasket 24 is formed by molding on a peripheral portion of the seal-integrated type electrode membrane assembly 12. When the seal-integrated type electrode membrane assembly 12 is sandwiched by and between the separators 14, the seal gasket 24 is brought into close contact with the separators 14 so as to prevent leakage of the fuel gas and cooling water. The seal gasket 24 has first seal lines SL and second seal line SL formed on the opposite surfaces of the seal-integrated type membrane electrode assembly 12. The first seal lines SL are formed around the individual manifold holes 16a-16f, and the second seal line SL surrounds a wide region that contains the gas manifold holes 16a, 16b, 16e, 16f and the electrode catalyst layer 26 but does not contain the coolant manifold holes 16c, 16d. The second seal line SL serves to prevent gas from leaking out of the fuel cell 10.

Each of the separators 14 is a triple-layer separator formed by laminating three thin plates made of a metal, namely, a cathode plate 14a, an intermediate plate 14b and an anode plate 14c. When the separators 14 are laminated on the seal-integrated type membrane electrode assembly 12, the cathode plate 14a contacts with one surface (the lower surface in FIG. 1) of the seal-integrated type membrane electrode assembly 12 on which a cathode-electrode catalyst layer (which will be described later) is provided, and the anode plate 14c contacts with the other surface (the upper surface in FIG. 1) of the seal-integrated type membrane electrode assembly 12 on which an anode-electrode catalyst layer (which will be described later) is provided.

The separator 14 is arranged to supply the anode gas supplied via the manifold hole 16a to the anode-electrode catalyst layer of a corresponding one of the unit cells 11, and supply the cathode gas supplied via the manifold hole 16e to the cathode-electrode catalyst layer of the corresponding unit cell 11. The separator 14 also performs the function of collecting electricity produced in the seal-integrated type membrane electrode assembly 12, and the function of supplying cooling water to the intermediate plate 14b via the manifold hole 16c so as to effect cooling. Furthermore, the separator 14 is arranged to lead the fuel gas and cooling water to the respective manifold holes for discharging. The separator 14 may have any structure or construction other than that comprised of three layers laminated as described above.

FIG. 2 is a cross-sectional view of the seal-integrated type membrane electrode assembly 12. The seal-integrated type membrane electrode assembly 12 is constructed such that an electrolyte membrane 20 is sandwiched by and between the anode-electrode catalyst layer 26a and the cathode-electrode catalyst layer 26c (which layers will be correctively called "electrode catalyst layer 26"), and such that an outer peripheral portion of the electrolyte membrane 20 is sandwiched by and between reinforcing films 22. Furthermore, the seal gasket 24 is formed by molding on an outer peripheral portion of the seal-integrated type membrane electrode assembly 12 so as to cover the reinforcing films 22 and outer peripheral portions of the electrode catalyst layers 26. The seal gasket 24 is formed so as to provide the above-mentioned seal lines SL on the opposite surfaces of the membrane electrode assembly 12. It is, however, to be understood that the seal gasket 24 need not be in contact with the electrode catalyst layers 26, and that the reinforcing films 22 may be eliminated.

The electrolyte membrane 20 is a thin film formed of a solid polymer material, which is capable of conducting protons and shows a good electrical conductivity under a damp condition. The electrode catalyst layer 26 carries a catalyst (e.g., platinum) that promotes electrochemical reactions. Also, gas diffusion layers 28 are provided for respectively covering the outer surfaces of the electrode catalyst layers 26 which are not in contact with the electrolyte membrane 20. The gas diffusion layer 28 is a porous body made of carbon, and has the function of supplying the fuel gas to the entire area of the corresponding electrode catalyst layer 26 by utilizing its ability to diffuse gas in the direction of the thickness thereof.

In this specification, the "electrode catalyst layer" means a layered structure consisting of a catalyst layer and a gas diffusion layer. In the technical field of fuel cells, the term "electrode layer" may be used to mean an electrode catalyst layer (i.e., a combination of a catalyst layer and a gas diffusion layer), or may be used to mean a catalyst layer alone, which does not include a gas diffusion layer. In this specification, too, the term "electrode layer" comprises these two meanings, and is used to mean what includes at least the catalyst layer. Also, in this specification, the "membrane electrode assembly" is used as a term meaning a structure comprised of at least an electrolyte membrane and a pair of electrode catalyst layers by and between which the electrolyte membrane is sandwiched, and the "seal-integrated type membrane electrode assembly" is used as a term meaning a structure in which a seal gasket is formed by injection molding on the opposite surfaces of the membrane electrode assembly.

B. Process of Manufacturing Seal-integrated Type Membrane Electrode Assembly (Comparative Example): FIG. 3A through FIG. 3D illustrate a part of the process of manufacturing the seal-integrated type membrane electrode assembly 12 according to the related art.

Figure 3A:
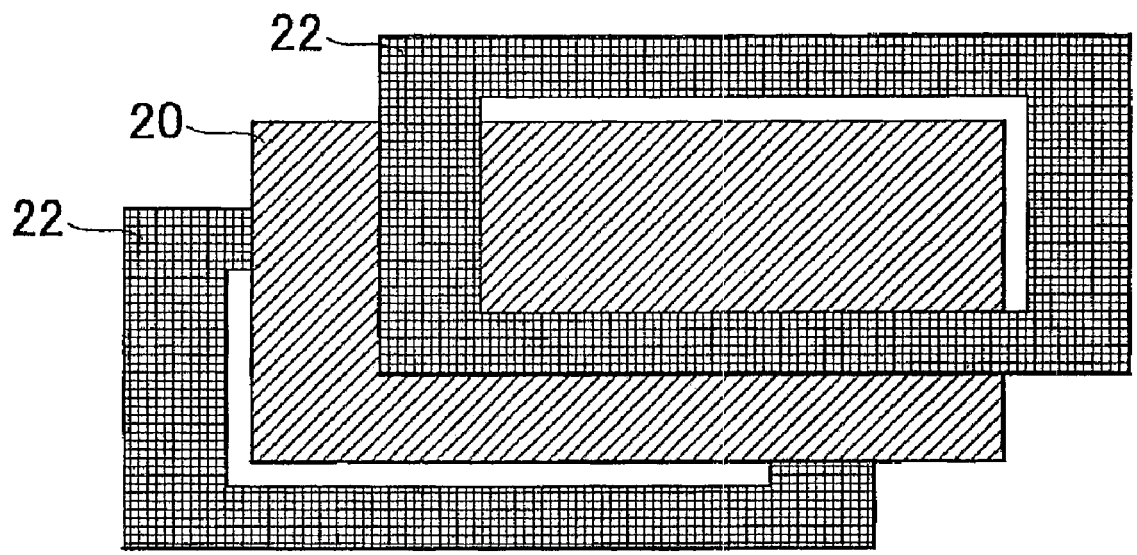
FIG. 3A-FIG. 3D are explanatory views illustrating process steps of manufacturing a membrane electrode assembly.

In FIG. 3A, the peripheral portion of the electrolyte membrane 20 is sandwiched by and between a pair of reinforcing films 22 each in the form of a rectangular frame. The reinforcing film 22 may be formed of, for example, polyimide or polyethylene naphthalate (PEN), and may have a thickness of 25-250 µm. The reinforcing film 22 may also be formed of a material which has a thermal expansion coefficient of 40× $10^{-6}$/K or lower, and can be used in environments of an oxidizing atmosphere having a temperature of −30° C. to 120° C. and pH=2.

Figure 3B:
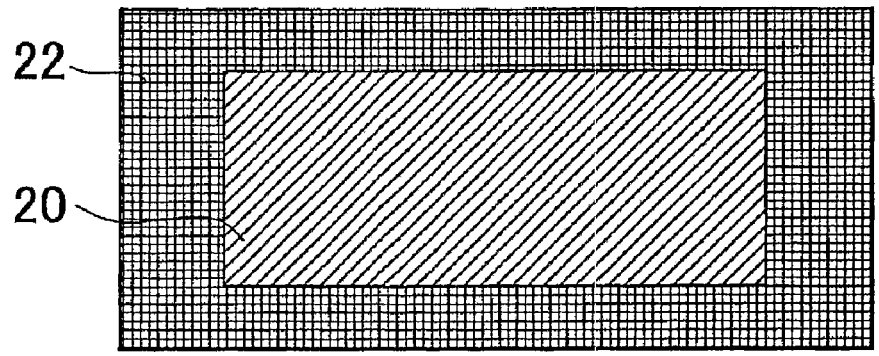

FIG. 3B shows a condition in which the electrolyte membrane 20 is sandwiched by and between the reinforcing films 22.

Figure 3C:
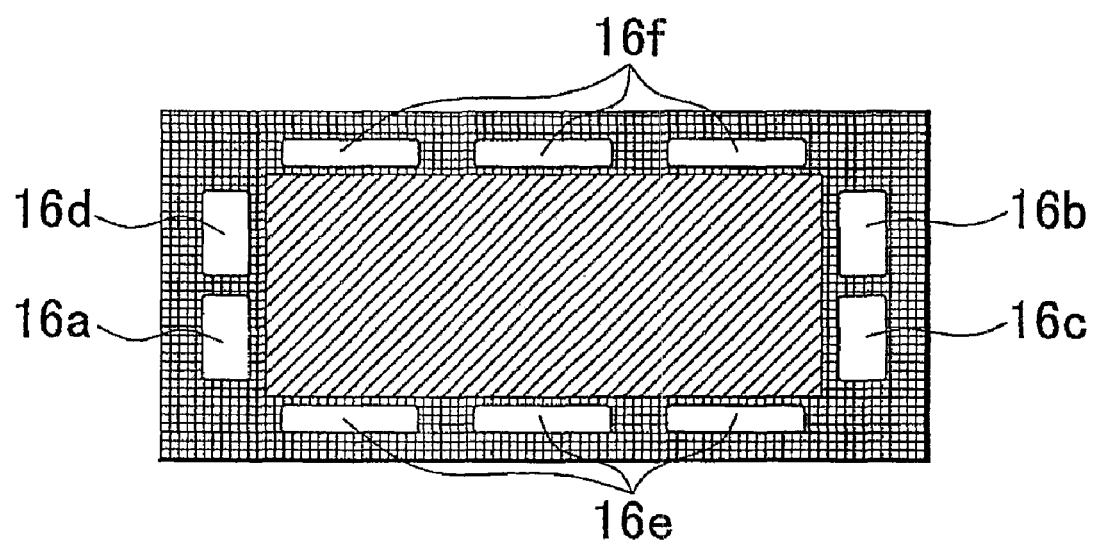

FIG. 3C shows a condition in which the manifold holes 16a-16f in the form of through-holes are formed in the portion of the electrolyte membrane 20 which is sandwiched between the reinforcing films 22.

Figure 3D:
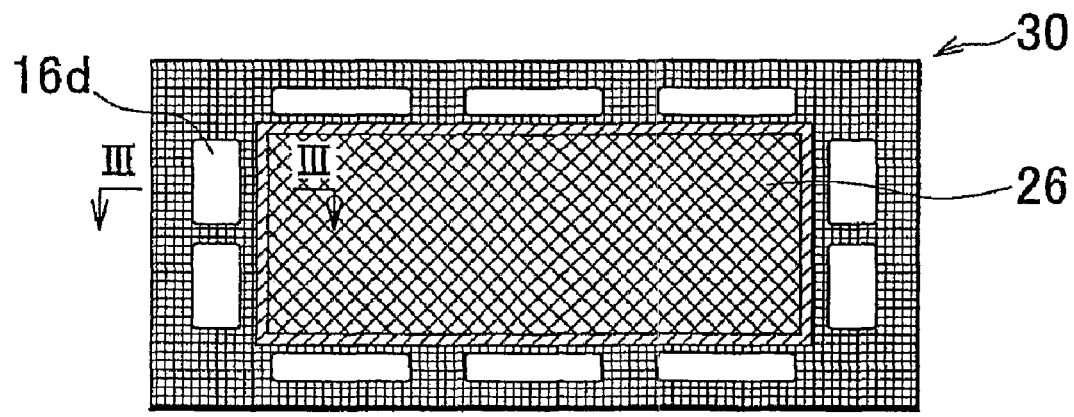

FIG. 3D shows a membrane electrode assembly 30 in a condition in which the electrode catalyst layers 26 are joined to the opposite surfaces of the electrolyte membrane 20. The electrode catalyst layers 26 may be disposed on the electrolyte membrane 20 in any of the process steps prior to that of FIG. 3D.

Figure 4:
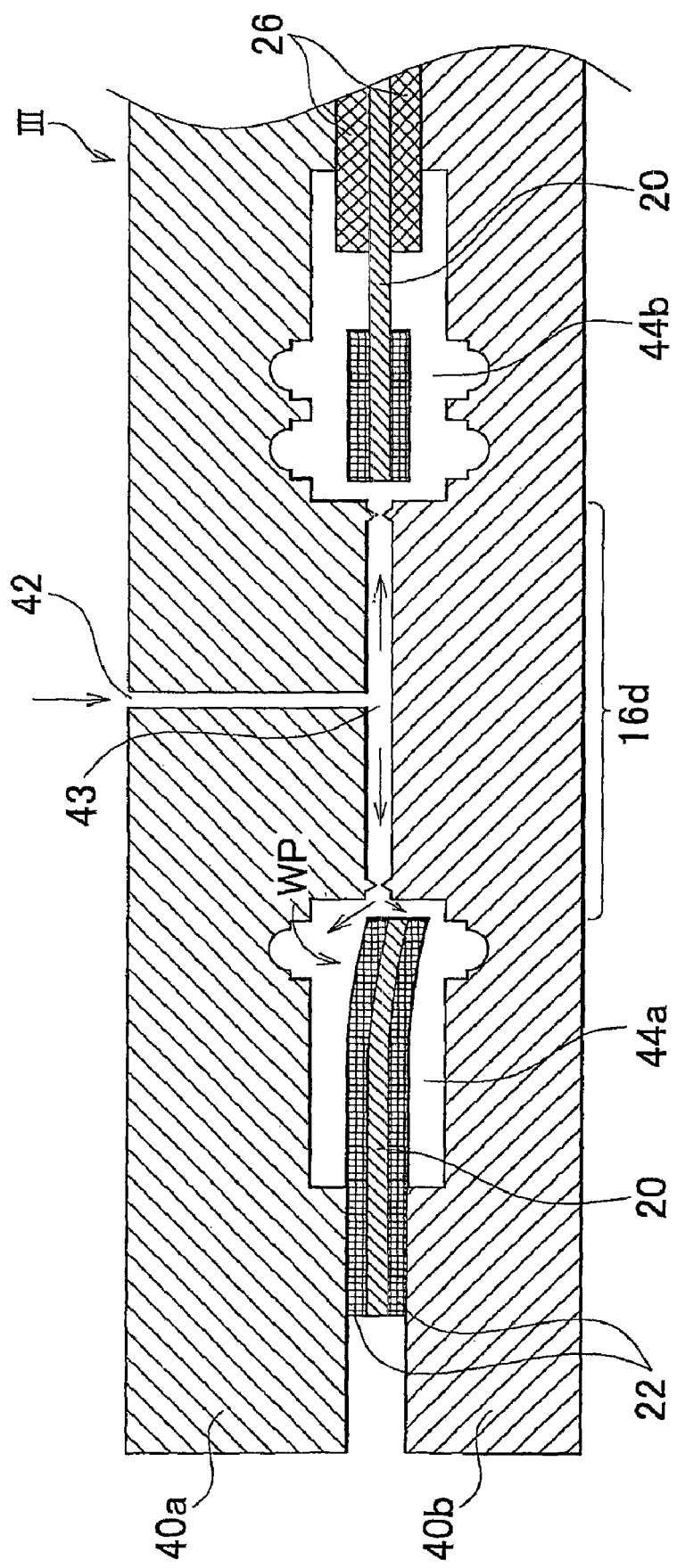
FIG. 4 is a view useful for explaining injection molding for the membrane electrode assembly in a comparative example.

Subsequently, the seal gasket 24 is formed by molding on a peripheral portion of the membrane electrode assembly 30. FIG. 4 shows a section III-III (FIG. 3D) taken when the membrane electrode assembly 30 is placed or set in a mold for injection molding. The membrane electrode assembly 30 is sandwiched by and between upper die 40a and lower die 40b of the mold. The arrows in FIG. 4 indicate direction in which a seal material flows when it is supplied to the mold. The upper die 40a is provided with a supply port 42 of the seal material, which is formed in a portion of the die 40a in which each manifold hole (e.g., manifold hole 16d in FIG. 3C and FIG. 3D) is formed. Also, cavities 44a, 44b are provided along the inside peripheries of each manifold hole. The seal material is supplied to the cavities 44a, 44b via a supply channel 43 that communicates with the supply port 42.

Figure 5A:
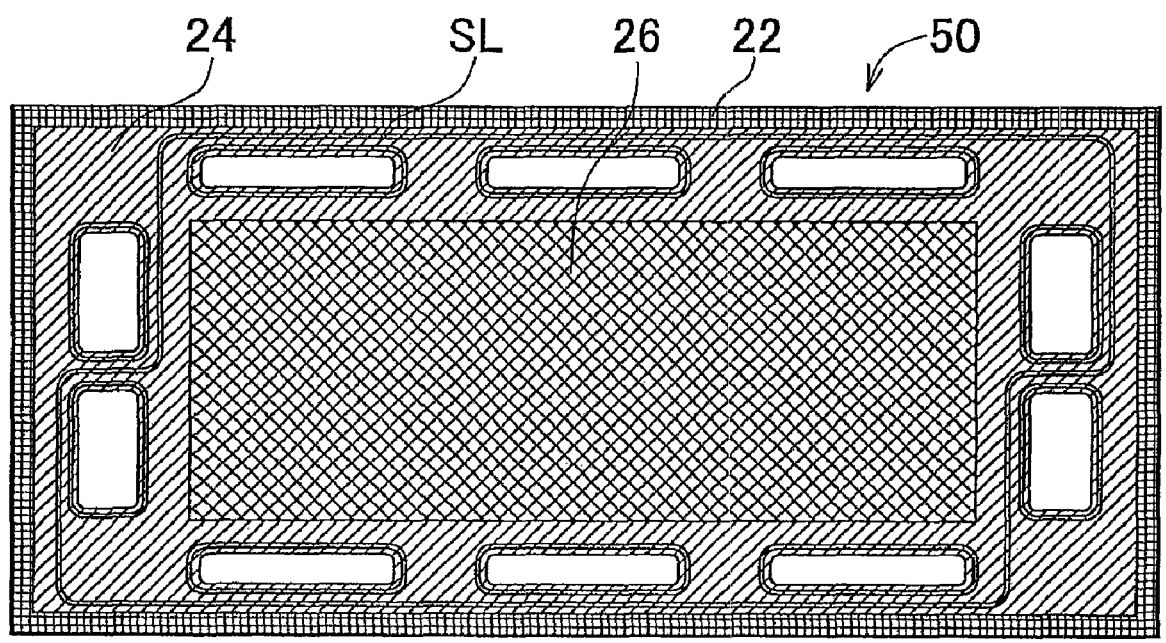
FIG. 5A-FIG. 5C are explanatory views showing a seal-integrated type membrane electrode assembly of the comparative example.
Figure 5B:
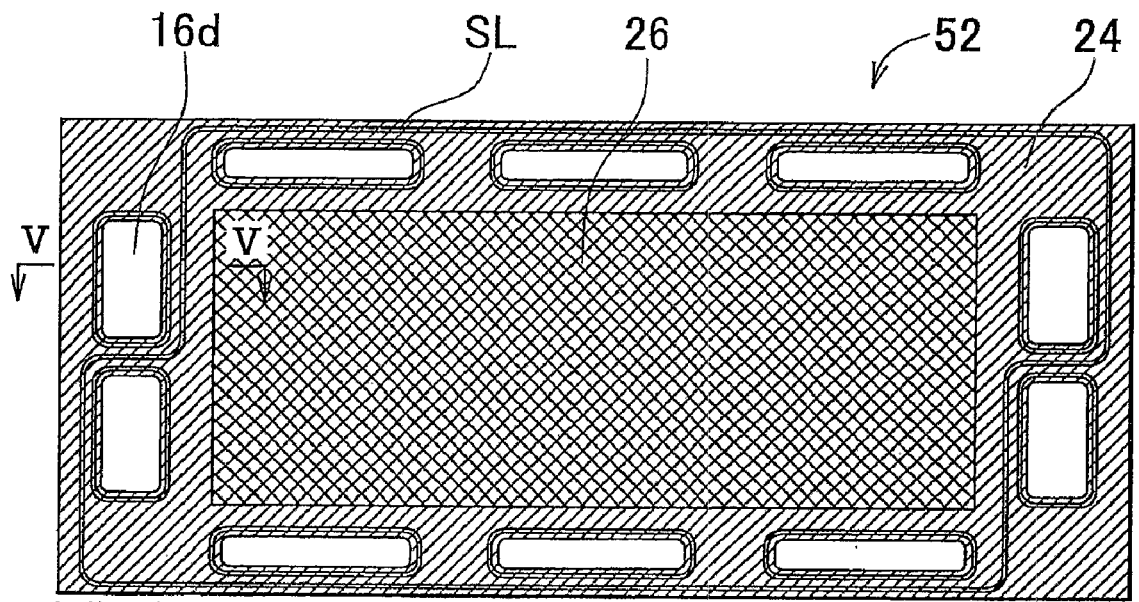
Figure 5C:
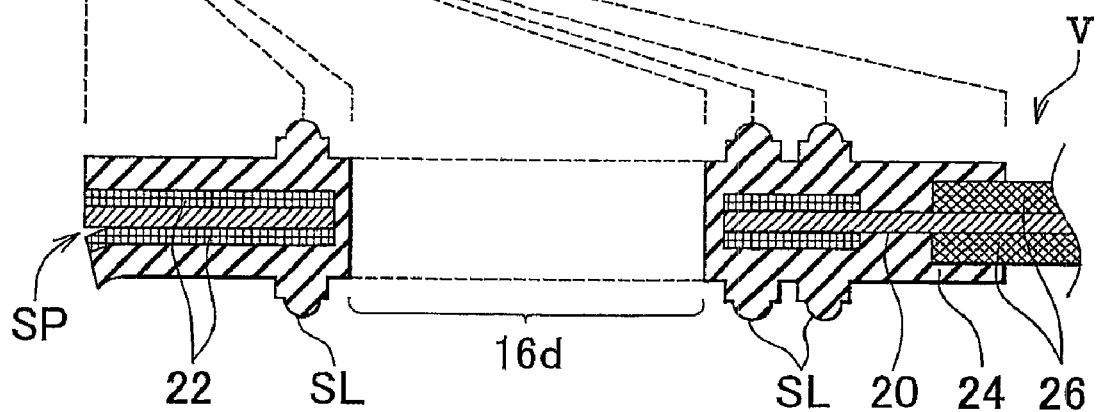

FIG. 5A through FIG. 5C illustrate process steps following the injection molding. FIG. 5A shows a seal-integrated type membrane electrode assembly 50 in which the seal gasket 24 has been formed by injection molding. The narrow areas defined by two lines on the seal gasket 24 represent seal lines SL for preventing leakage of fluid. The seal material that remains in the supply channel 43 (FIG. 4) is removed immediately after the injection molding.

FIG. 5B shows a seal-integrated type membrane electrode assembly 52 that is completed by cutting off redundant portions of the electrolyte membrane 20 and reinforcing films 22 in an outer edge portion of the seal-integrated type membrane electrode assembly 50. FIG. 5C shows a section V-V of FIG. 5B. As shown in FIG. 5C, the seal lines SL form lips (or protrusions), whose tops are pressed against the separators 14 mounted on the membrane electrode assembly 52 so as to provide seal against leakage of fluid.

Although the seal-integrated type membrane electrode assembly may be manufactured according to the above method of the comparative example, this method suffers from problems as described below.

Problem 1: During injection molding as shown in FIG. 4, a portion WP of the membrane electrode assembly 30 (more precisely, the inside periphery of the manifold hole) is not supported in the cavity. Therefore, this portion WP is warped or curved toward the lower die 40b due to an influence of the gravity. As a result, the portion WP of the membrane electrode assembly 30 may block or obstruct a seal-material supply channel that leads to the lower part of the cavity 44a on the side of the lower die 40b, and the amount of supply of the seal material to the lower part of the cavity 44a on the side of the lower die 40b may be reduced as compared with the amount of supply of the seal material to the upper part of the cavity 44a on the side of the upper die 40a. Thus, the seal material may not be equally supplied to the upper and lower parts of the cavity 44a. In FIG. 4, a difference in size (or length) between the arrows indicating the directions of flow of the seal material generally represents a difference in the amount of flow of the seal material. This difference may become a cause of poor molding. This problem similarly takes place in other cavities.

Problem 2: The electrode catalyst layer 26 includes the gas diffusion layer, and a paste is often applied by coating to the surface of the gas diffusion layer so as to make the layer water-repellent. Since the strength of adhesion between a paste material (for example, powder of polytetrafluoroethylene (PTFE) resin) and a base material of the gas diffusion layer is low, a part of the paste material may fall or peel off from the gas diffusion layer under the influences of the temperature reached during injection molding or the swaging force applied to the mold. The paste material thus removed remains in the mold, causing contamination of the interior of the mold, whereby finished dimensions of the membrane electrode assembly subjected to injection molding may deviate from target values. It is thus necessary to clean the mold at frequent intervals so as to ensure sufficient quality, which results in reduced productivity.

Problem 3: Since the electrode catalyst layer 26 has an uneven surface, the surface pressure applied to the electrode catalyst layer 26 also becomes uneven during swaging for holding the membrane electrode assembly 30 in the mold, namely, sandwiching the assembly 30 between the upper and lower dies. Accordingly, the seal material may leak from a portion or portions of the electrode catalyst layer 26 having a relatively low surface pressure. Also, if a portion of the mold which contacts with the electrode catalyst layer 26 is contaminated by the paste material as described above, the electrode catalyst layer 26 may be damaged during swaging.

Problem 4: As shown in FIG. 5C, on the cut planes of the outer periphery of the seal-integrated type membrane electrode assembly 52, the outer edges (end faces) of the mating surfaces between the electrolyte membrane 20 and the reinforcing films 22 remain exposed to the outside of the assembly 52. The electrolyte membrane 20 has poor adhesion as an inherent chemical property, and is also not able to withstand a high-temperature condition (in this case, the fusing point of the reinforcing film 22, which is, for example, 200° C.) required for thermal deposition. Thus, the reinforcing films 22 cannot be thermally deposited on the electrolyte membrane 20. Therefore, a peeled-off portion SP is likely to appear between the electrolyte membrane 20 and the reinforcing film 22, and may cause damage or breakage of the seal-integrated type membrane electrode assembly 52.

C. Embodiment of the Invention: In view of the above-described problems, a method of manufacturing a membrane electrode assembly according to one embodiment of the invention will be described. The method of this embodiment has process steps that are substantially identical with those of the above-described comparative example as shown in FIG. 3A through FIG. 3D.

Figure 6:
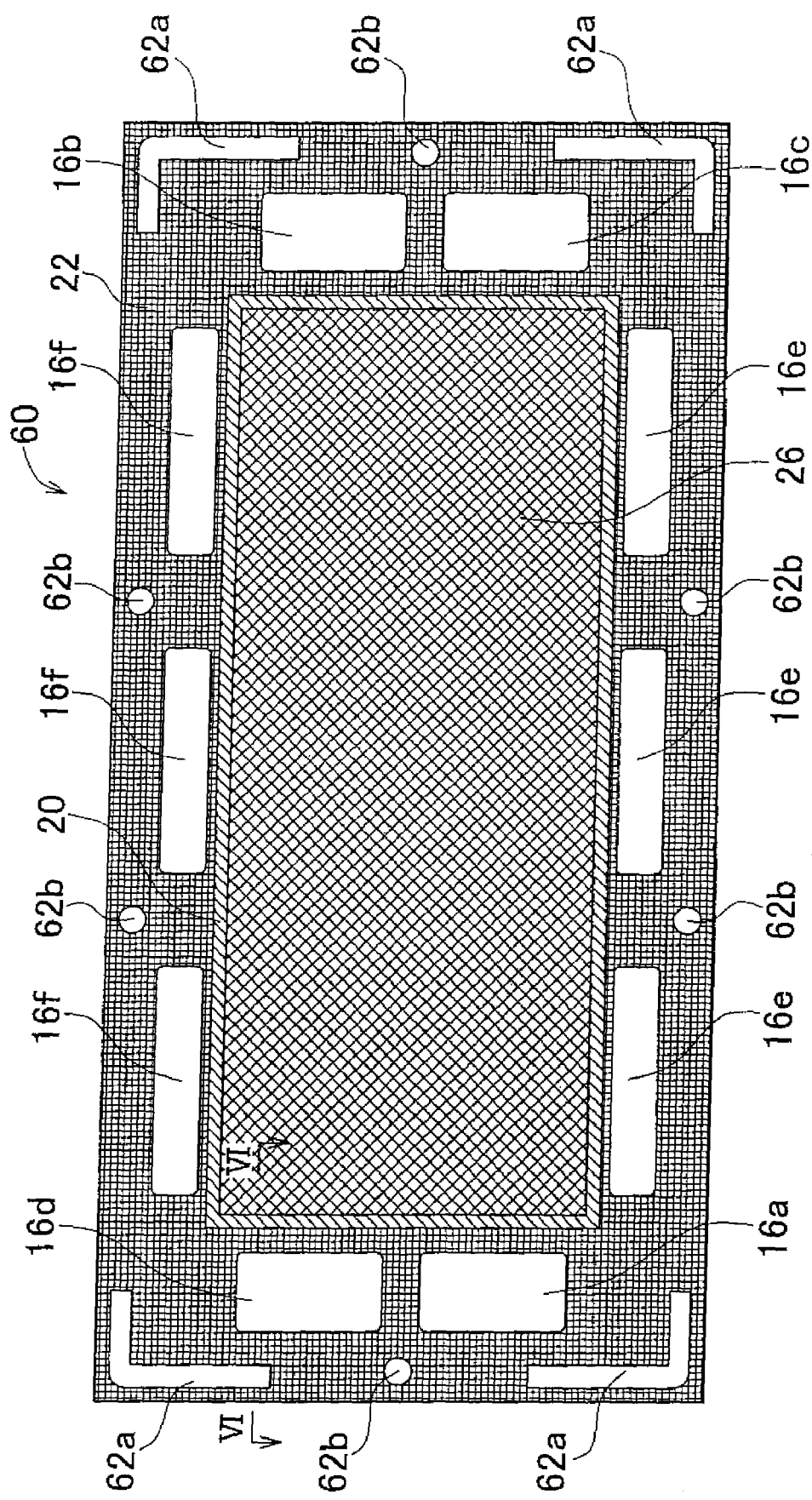
FIG. 6 is an explanatory view showing a membrane electrode assembly according to one embodiment of the invention.

FIG. 6, which corresponds to FIG. 3D, illustrates a membrane electrode assembly obtained prior to injection molding according to the present embodiment. The membrane electrode assembly 60 is identical with the membrane electrode assembly 30 of FIG. 3D except that seal-material flow holes 62a, 62b in the form of through-holes are added to the membrane electrode assembly 30. The seal-material flow holes 62a, 62b of two types are formed between the manifold holes 16a-16f and the outer periphery of the membrane electrode assembly 60. The first seal-material flow holes 62a are located at four corners of the membrane electrode assembly 60, and the second seal-material flow holes 62b are located between the manifold holes that extend in parallel with the four sides of the membrane electrode assembly 60. In this embodiment, each of the first seal-material flow holes 62a is generally in the shape of the letter L, and each of the second seal-material flow holes 62b has a circular shape. However, these flow holes 62a, 62b may have other shapes.

After the seal-material flow holes 62a, 62b are formed, a seal gasket similar to that of the above-described comparative example is formed by molding in a peripheral portion of the membrane electrode assembly 60. FIG. 7 shows a section VI-VI (FIG. 6) taken when the membrane electrode assembly 60 is placed or set in the mold. In FIG. 7, the seal-material flow hole 62a is located in the cavity 44a, and protective films 70 are disposed on contact surfaces between the electrode catalyst layers 26 and the upper and lower dies 40a, 40b of the mold, respectively. The other arrangements or features of FIG. 7 are identical with those of FIG. 4. It is to be noted that the seal-material flow hole 62a and an inside peripheral portion of the manifold hole 16d are located in the same cavity.

For injection molding, a seal material is supplied from the supply port 42 to the cavity 44a and cavity 44b via the supply channel 43. At this time, the seal material that flows toward the upper die 40a in the cavity 44a passes through the seal-material flow hole 62a, and then flows toward the lower die 40b. The seal material may also flow in the reverse direction. As a result, a difference between the amount of supply of the seal material on the side of the upper die 40a and that of the seal material on the side of the lower die 40b as mentioned above with regard to Problem 1 is reduced. Substantially the same effect can also be obtained at portions having other seal-material flow holes and manifold holes. It is to be understood that the supply port 42 need not be provided at a location where each manifold hole is formed, but may be present at any other location.

The number and locations of the seal-material flow holes 62a, 62b may be selected as desired, and these holes may be formed at locations other than the above-indicated locations. For example, the seal-material flow holes 62a, 62b may be formed to be located between the manifold holes 16a-16f (FIG. 6) and the electrode catalyst layers 26. It is, however, preferable that at least one of the seal-material flow holes 62a, 62b be located between the manifold holes 16a-16f and the outer periphery of the membrane electrode assembly 60. Also, each of the seal-material flow holes 62a, 62b may be formed at any location provided that the hole 62a, 62b is disposed in a cavity when the membrane electrolyte assembly 60 is placed in the mold, and is located in the vicinity of at least one of the manifold holes.

The protective films 70 (FIG. 7) are arranged to cover the entire areas of the contact surfaces of the electrode catalyst layers 26 with the mold. The protective film 70 may be formed of, for example, polyimide, PEN, polyethylene terephthalate (PET), fluororesin, silicone rubber, or fluororubber, and may have heat resistance to 150° C. or higher. The protective film 70 may have a thickness of about 50 μm to 200 μm. The protective films 70 thus formed prevent the paste material applied by coating to the electrode catalyst layers 26 from being deposited on the mold, thus preventing contamination of the mold, so that Problem 2 as described above is eliminated.

In the present embodiment in which the protective films 70 are disposed on the electrode catalyst layers 26, the electrode catalyst layers 26 do not directly contact with the mold, and are thus prevented from being damaged during swaging even if the mold is contaminated. Furthermore, if the protective films 70 have a thickness of about 0.5 mm-1 mm, the unevenness of the surface pressures applied to the electrode catalyst layer 26 during swaging, which would arise due to the uneven surfaces of the electrode catalyst layers 26, can be eliminated. Thus, upon supply of the seal material, the seal material can be prevented from leaking from a portion or portions having a relatively low surface pressure, and Problem 3 as described above can be eliminated.

The protective film 70 may be formed by coating the mating surface of the electrode catalyst layer 26 with, for example, an adhesive. Also, the protective film 70 may be disposed on the electrode catalyst layer 26 when the electrode catalyst layer 26 is disposed on the electrolyte membrane 20, or the protective film 70 may be disposed on the electrode catalyst layer 26 in any process step prior to mounting of the membrane electrode assembly into the fuel cell 10. Thus, the electrode catalyst layers 26 are prevented from being damaged during the process of fabricating the fuel cell. It is, however, to be understood that the protective films 70 may be eliminated.

Figure 8A:
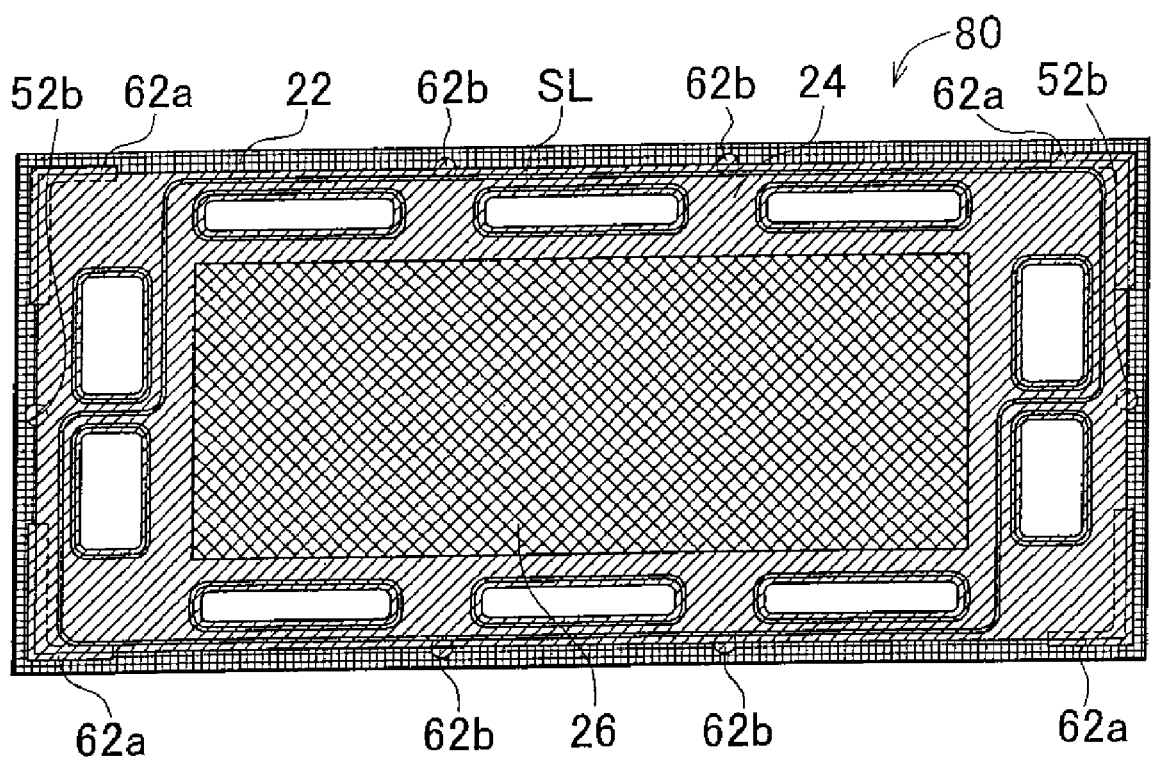
FIG. 8A-FIG. 8C are explanatory views showing a seal-integrated type membrane electrode assembly of the embodiment.
Figure 8B:
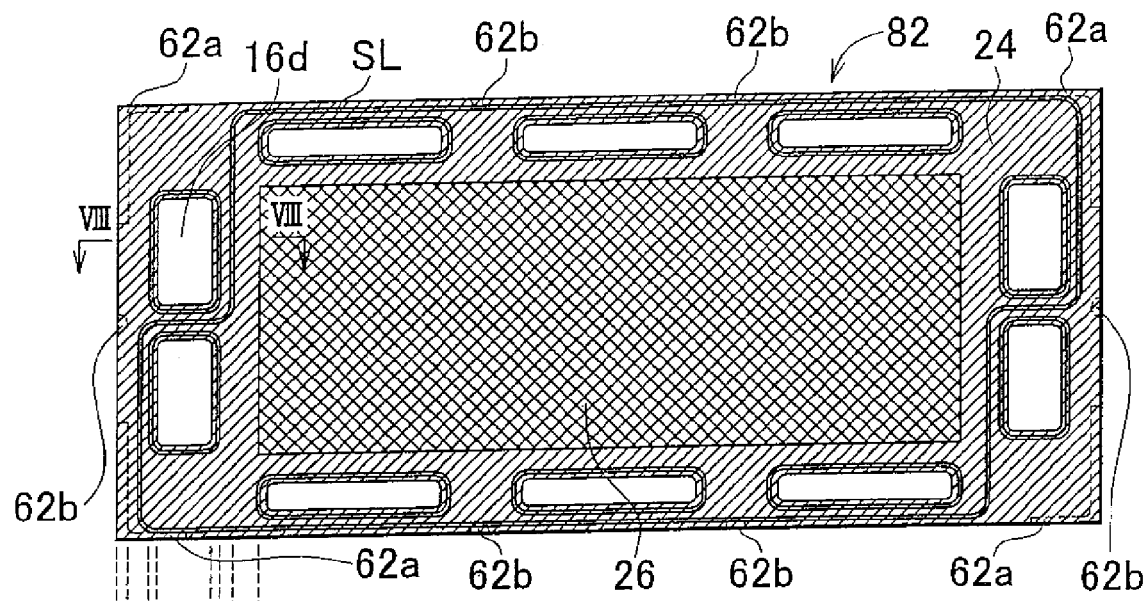
Figure 8C:
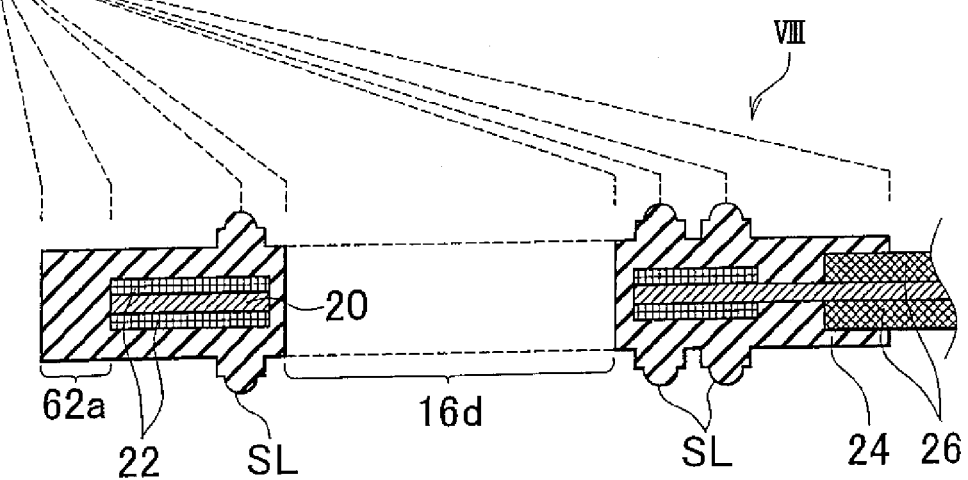

FIG. 8A-FIG. 8C illustrate process steps subsequent to the injection molding according to the present embodiment. FIG. 8A-FIG. 8C are identical with FIG. 5A-FIG. 5C except for molded portions (denoted by the same numerals as the seal-material flow holes 62a, 62b) which are formed by feeding the seal material into the seal-material flow holes 62a, 62b.

FIG. 8A shows a seal-integrated type membrane electrode assembly 80 obtained immediately after the injection molding. As compared with the seal-integrated type membrane electrode assembly 50 of FIG. 5A, the seal gasket 24 of the membrane electrode assembly 80 of FIG. 8A includes additional portions formed in the seal-material flow holes 62a, 62b. FIG. 8B shows a seal-integrated type membrane electrode assembly 82 as a finished product, which is obtained by cutting off redundant portions of the electrolyte membrane 20 and reinforcing films 22 present in the outer peripheral portion of the seal-integrated type membrane electrode assembly 80. FIG. 8C shows a section VIII-VIII of the seal-integrated type membrane electrode assembly 82.

In this embodiment, the seal-material flow holes 62a, 62b are formed so as to lie on the cutting planes along which the outer peripheral portion of the seal-integrated type membrane electrode assembly 80 is cut off. Thus, the membrane electrode assembly 80 is trimmed along the planes in which the seal-material flow holes 62a, 62b are present. As shown in FIG. 8C, the seal material that fills each of the seal-material flow holes 62a, 62b covers an end face of the seal-integrated type membrane electrode assembly 82. With this arrangement, peeled-off portions like the peeled-off portion SP (FIG. 5C) of the electrolyte membrane 20 and reinforcing film 22 as mentioned above with respect to Problem 4 can be prevented from appearing at the locations where the seal-material flow holes 62a, 62b are present, and end faces of the seal-integrated type membrane electrode assembly 82 have improved peel resistance. The peel resistance is improved as the cross-sectional areas of the seal-material flow holes 62a, 62b that lie in the cutting planes increase. It is, however, to be understood that the seal-material flow holes 62a, 62b may be formed at locations at which the cutting planes do not pass or extend through the holes 62a, 62b.

The membrane electrode assembly 80 may not be trimmed at the outer periphery, and may be used in the form shown in FIG. 8A.

As is understood from FIG. 8A, the seal gasket 24 formed around the electrode catalyst layers 26 is formed in one piece as an entirely continuous or integral body. Thus, cavities of the mold as shown in FIG. 7 are all connected into a single, large cavity. It is, however, to be understood that the cavity may be divided into a plurality of sections, and the seal gasket 24 may be divided into two or more portions.

Figure 9:
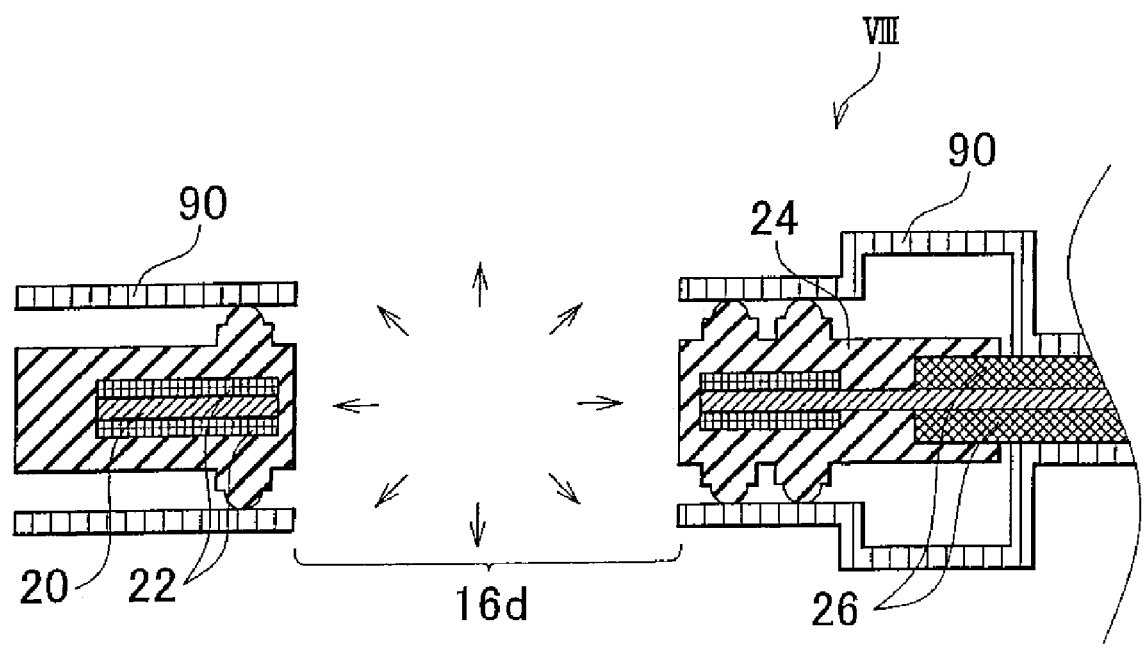
FIG. 9 is a schematic view for explaining pressures applied to a manifold hole in the embodiment.

FIG. 9 is a cross-sectional view of the same location as that of the section VIII-VIII of FIG. 8C, which is obtained when the seal-integrated type membrane electrode assembly 82 is sandwiched by and between separators 90. In FIG. 9, arrows in the manifold hole 16d indicate directions in which pressures are applied when a fluid flows into the manifold hole 16d. When gas or water actually flows through the manifold holes 16a-16f, substantial pressures are applied to the interior walls of the holes, and, therefore, the interior walls of the manifold holes 16a-16f need to have strength high enough to withstand the pressures. In the present embodiment, the reinforcing films 22 surround the peripheries of the manifold holes 16a-16f, and are formed integrally with the seal gasket 24, thus assuring sufficiently high strength of the interior walls of the holes 16a-16f. It is, however, to be understood that the reinforcing films 22 may be eliminated.

D. Modified Examples of the Invention: It is to be understood that the invention is not limited to the illustrated embodiment, but may be embodied in various forms without departing from the principle of the invention. For example, the illustrated embodiment may be modified in the manners as described below.

Figure 10:
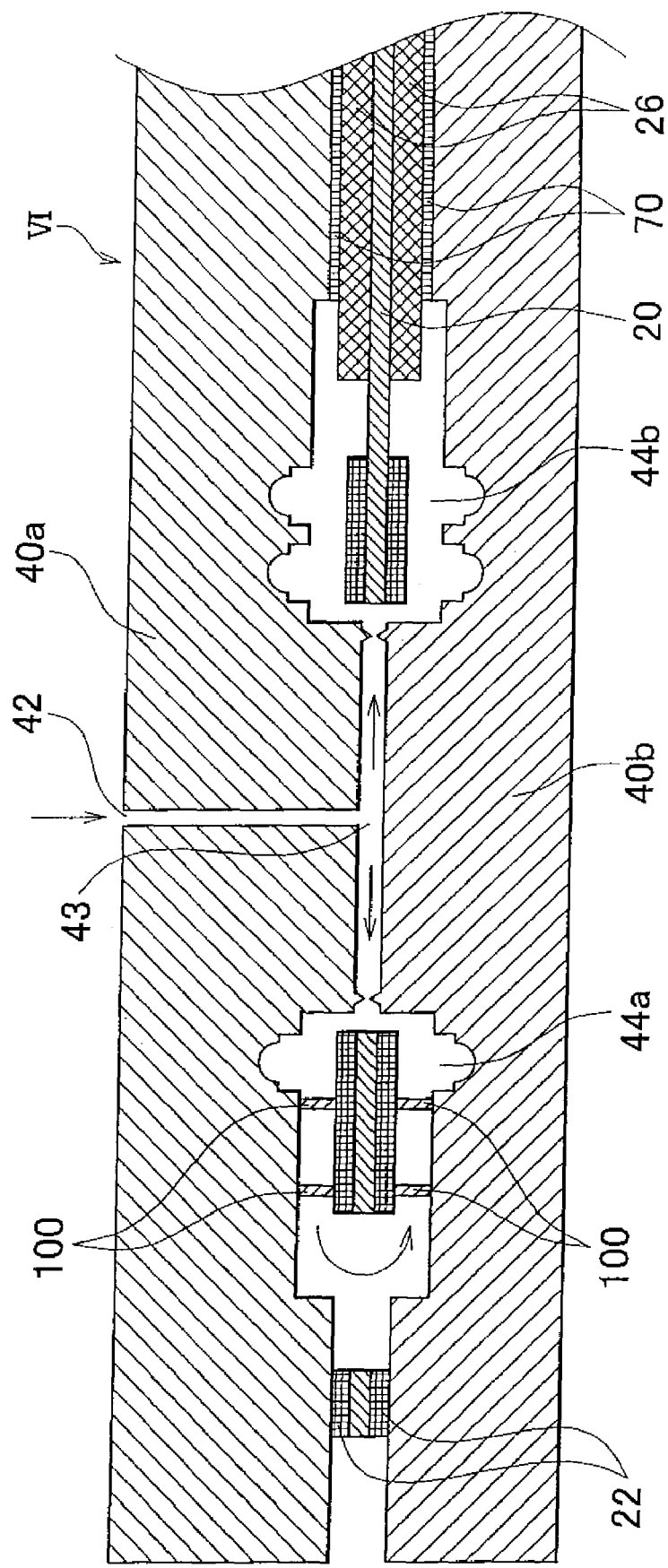
FIG. 10 is a view useful for explaining injection molding for a membrane electrode assembly according to a modified example 1.

D1. Modified Example 1: FIG. 10 is an explanatory view useful for explaining a modified example 1 of the illustrated embodiment of the invention. In FIG. 10, pins 100 are additionally provided on the upper die 40a and lower die 40b in the cavity 44a, and the other arrangements or features of FIG. 10 are identical with those of FIG. 7. The pins 100 are provided integrally on the upper die 40a and lower die 40b of the mold, for supporting a portion of the membrane electrode assembly 60 which is located in the cavity 44a when the assembly 60 is placed in the mold. With the pins 100 thus provided, the membrane electrode assembly 60 is stably set in the mold, and the seal material is more evenly supplied to the upper die 40a and the lower die 40b, so that molding failures or defects are even less likely to occur. The pins 100 may also be provided in the right-side cavity 44b, and the shape, number and locations of the pins 100 may be selected as desired as far as the pins 100 can support unstable portions of the membrane electrode assembly 60 in the mold.

Figure 11:
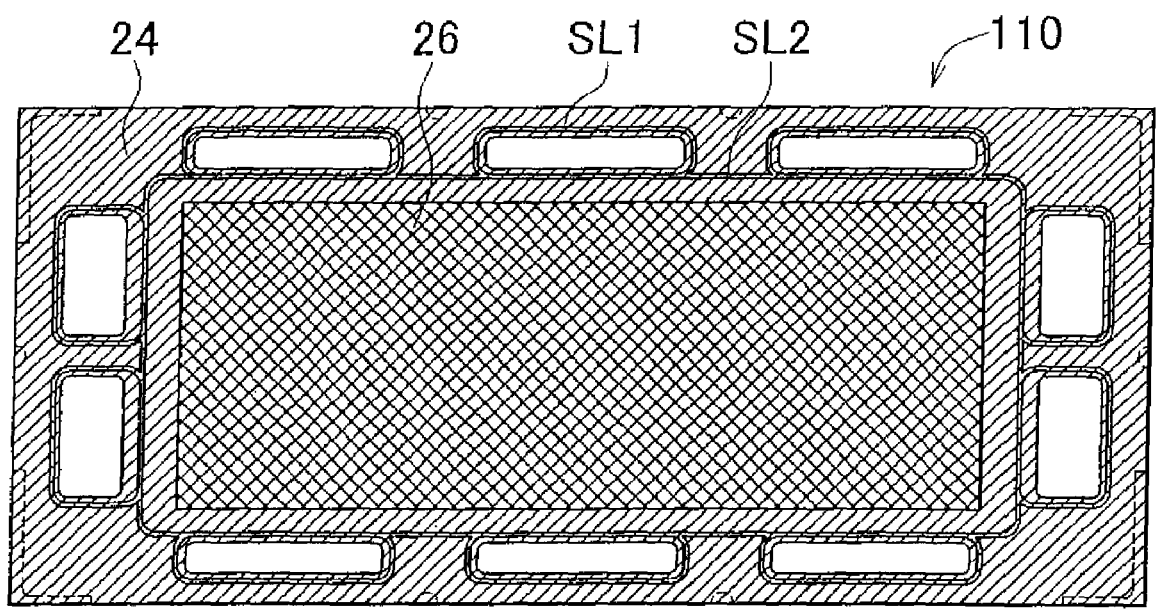
FIG. 11 is an explanatory view showing a seal-integrated type membrane electrode assembly according to a modified example 2.

D2. Modified Example 2: In the illustrated embodiment, the seal lines SL formed on the seal gasket 24 by injection molding are arranged to provide doubled seal to the manifold holes 16a, 16b, 16e, 16f that provide gas channels, as shown in FIG. 8A-8C. However, the arrangement of the seal lines SL is not limited to this arrangement, but seal lines SL1, SL2 may be formed as indicated by narrow areas defined by two lines in FIG. 11. More specifically, the first seal lines SL1 are formed so as to surround the individual manifold holes 16a-16f, and the second seal line SL2 is formed so as to surround only the electrode catalyst layers 26. While the two types of seal lines SL1, SL2 include shared portions in the example of FIG. 11, the seal lines SL1, SL2 may be arranged in the form of separate seal lines having no shared portions. As is understood from these examples, the seal gasket is generally constructed to provide individual seal lines for sealing the peripheries of the respective manifold holes, and a gas seal line for sealing a region that contains at least the electrode catalyst layers. It is, however, to be understood that a seal gasket having only the individual seal lines for the manifold holes may also be employed.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. A method of manufacturing a seal-integrated membrane electrode assembly for use in a fuel cell, comprising:
   (a) preparing a fuel cell membrane electrode assembly, wherein a manifold hole and a seal-material flow hole separate from the manifold hole are disposed in the membrane electrode assembly;
   (b) placing the membrane electrode assembly in a mold;
   (c) feeding a seal material into the mold, thereby to form a seal gasket having a seal line by injection molding, said seal line being formed around the manifold hole, wherein
   the membrane electrode assembly is formed such that inside peripheral portions of the manifold hole and the seal-material flow hole are located in the same cavity of the mold; and
   (d) cutting off an outer peripheral portion of the membrane electrode assembly along a plane extending through said seal-material flow hole.

2. A method according to claim 1, wherein:
   the manifold hole and the seal-material flow hole are formed in an outer peripheral portion of the membrane electrode assembly;
   a reinforcing member is provided on the outer peripheral portion of the membrane electrode assembly; and end faces of the membrane electrode assembly and the reinforcing member are covered with the seal material in the step (c).

3. A method according to claim 1, wherein, in the step (c), the seal material is supplied into the mold, from a location where the manifold hole is formed.

4. A method according to claim 1, wherein:

the membrane electrode assembly is provided with a plurality of the seal-material flow holes; and at least one of the plurality of the seal-material flow holes is formed so as to be located between the manifold hole and an outer periphery of the membrane electrode assembly.

5. The method of claim 1, wherein the seal-material flow hole leads the seal material fed into the cavity from one side of the membrane electrode assembly to another side of the membrane electrode assembly within the cavity of the mold.

* * * * *